(12) United States Patent
Li

(10) Patent No.: US 6,848,830 B1
(45) Date of Patent: Feb. 1, 2005

(54) OIL-CIRCULATING STRUCTURE FOR FAN

(76) Inventor: Nien-Lun Li, 11Fl., No. 5, Tianshiang 5th St., Taoyuan City, Taoyuan (TW)

( * ) Notice: Subject to any disclaimer, the term of this patent is extended or adjusted under 35 U.S.C. 154(b) by 14 days.

(21) Appl. No.: 10/617,714

(22) Filed: Jul. 14, 2003

(51) Int. Cl.$^7$ ............................................... F16C 17/02
(52) U.S. Cl. ....................................................... 384/114
(58) Field of Search ................................. 384/107, 112, 384/114, 119, 120

(56) References Cited

U.S. PATENT DOCUMENTS 4,764,085 A * 8/1988 Jesinger ...................... 384/114
5,847,479 A * 12/1998 Wang et al. ................. 384/112

* cited by examiner

*Primary Examiner*—Lenard A. Footland
(74) *Attorney, Agent, or Firm*—Troxell Law Office PLLC

(57) ABSTRACT

An oil-circulating structure for fan comprises an oily bearing with a central axis hole for pivoting a fan shaft. An inner oil-collecting recess trench is formed in the central axis hole of the oily bearing and has an inner thread shape oil-guiding trench set inside. Radial through holes penetrate from two ends of the inner thread shape oil-guiding trench to outside wall of the bearing. An outer oil-collecting recess trench is formed on the outside wall of the bearing and is connected with the inner thread shape oil-guiding trench by means of the radial through holes. When the fan rotates, a lubricant in the inner oil-collecting recess trench is pushed by the rotating fan shaft to flow in-and-out between the outer oil-collecting recess trench and the inner oil-collecting recess trench through the inner thread shape oil-guiding trench and the radial through holes so as to achieve oil-circulation of the oily bearing in which the lubricant won't overflow through the end surface of the oily bearing.

4 Claims, 3 Drawing Sheets

US 6,848,830 B1

OIL-CIRCULATING STRUCTURE FOR FAN

FIELD OF THE INVENTION

The present invention is relating to a bearing lubricating structure for DC fan without bushing, more particularly to an oil-circulating structure for fan.

BACKGROUND OF THE INVENTION

Since electronic device generates heat during operating, it will damage easily due to overheat without effective heat-dissipation. It is common to install a DC fan without bushing on electronic device for heat-dissipating. The DC fan without bushing has been well known to set various bearing like a ball bearing or an oily bearing between a fan wheel and a fan housing in order to enhance rotation and diminish noise of the fan. The oily bearing has porous structure made by sintering copper alloy or iron alloy so as to absorb a lubricant. However, the lubricant will be pushed to sputter by rotating a fan shaft to contaminate entire the fan housing when the fan shaft in the oily bearing rapidly rotates, and the oil-retaining quantity of the oily bearing decreases and distributes unevenly. Therefore, when the fan is used for a long time, the lubricating efficiency of bearing becomes bad gradually noise of bearing becomes loud gradually, even the fan will stop rotating.

A heat-dissipating fan was disclosed in R.O.C. Taiwan Patent No. 471557 entitled " lubricating oil-circulating structure for fan shaft", which is composed of a housing, a stator and a rotor. An oily bearing has a bearing body with through holes (i.e. axis holes). A ring portion is extended from one end of the bearing body to form an oil tank. A trench is set on the radial surface of bearing body to make a released lubricant flow to the trench by passing the through holes and return to the oil tank and the through holes by passing the trench. The oil tank is set at the ring portion of the oily bearing and the trench is set on the bearing body, so that the lubricant will flow to the end surface of the oily bearing to reduce oil-retaining quantity resulting in weakening lubricating effect. Besides, since the oil tank and the trench are the shape of a line easy to result in gathering lubricant at one side only, the oil-circulating efficiency of the lubricant becomes worse.

SUMMARY

The primary object of the present invention is to provide an oil-circulating structure for fan. An inner thread shape oil-guiding trench is set in an inner oil-collecting recess trench that is formed in an axis hole of an oily bearing. Radial through holes are separately set at the two ends of the inner thread shape oil-guiding trench and penetrate to an outer oil-collecting recess trench outside the oily bearing to make a lubricant flow in the axis hole following the rotation of fan shaft, then through the radial through holes flow into the outer oil-collecting recess trench without overflowing to end surfaces of the oily bearing so as to perform an internal-recycle oil-circulating efficiency.

According to the oil-circulating structure for fan of the present invention, an oily bearing is set in a fan housing and has a central axis hole for pivoting a fan shaft. An inner oil-collecting recess trench is formed in the axis hole of the bearing and has an inner thread shape oil-guiding trench set inside. Radial through holes penetrate from two ends of the inner thread shape oil-guiding trench to outside wall of the bearing. An outer oil-collecting recess trench is formed on the outside wall of the oily bearing. The radial through holes penetrate the bearing to connect the inner thread shape oil-guiding trench with the outer oil-collecting recess trench. When the fan rotates, a lubricant in the inner oil-collecting recess trench is pushed by the rotating fan shaft to flow to the outer oil-collecting recess trench through the inner thread shape oil-guiding trench and along the radial through holes for avoiding overflowing from the end surface of the oily bearing so as to perform an axis hole internal-recycle oil-circulating of the oily bearing.

DETAILED DESCRIPTION OF THE PRESENT INVENTION

Figure 1:
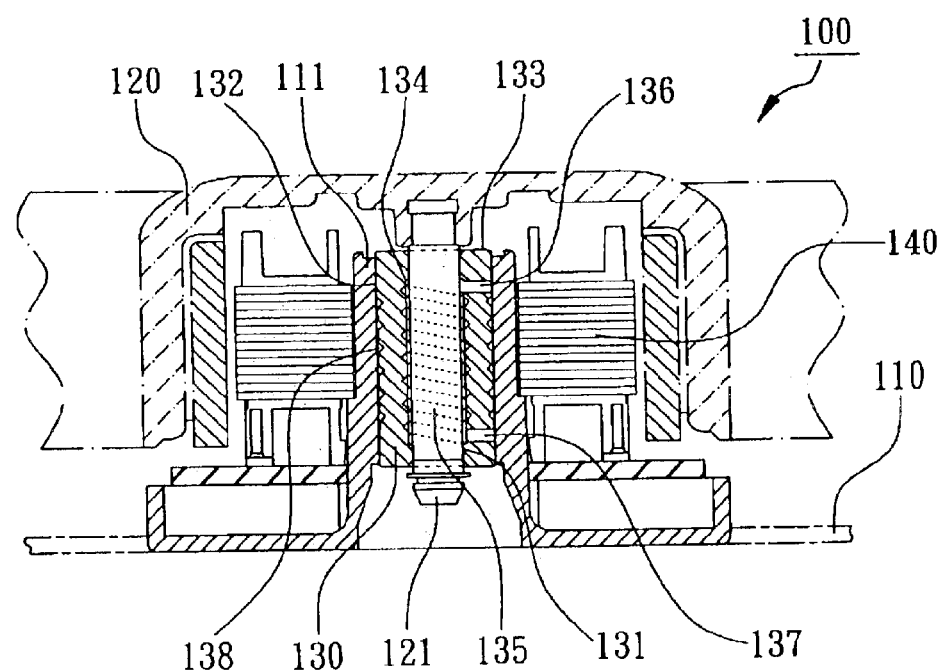
FIG. 1 is a cross sectional view of a fan assembly with a fan oil-circulating structure in accordance with the present invention.
Figure 2:
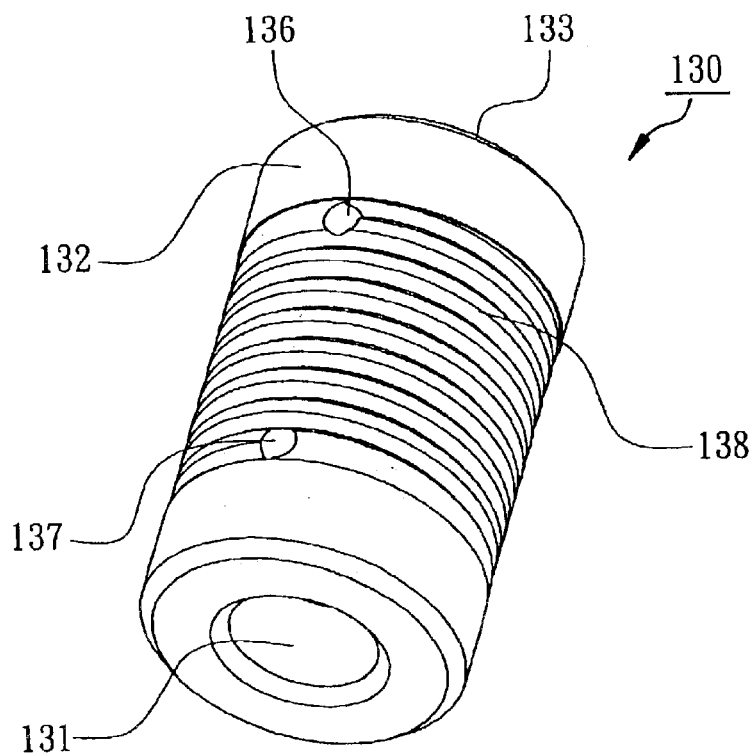
FIG. 2 is a perspective view of an oil-circulating structure for fan in accordance with the present invention.
Figure 3:
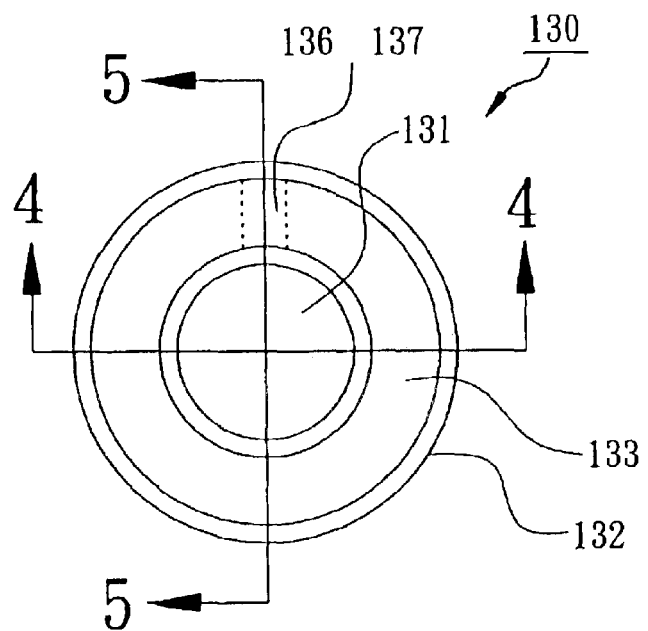
FIG. 3 is a top view of the oil-circulating structure for fan in accordance with the present invention.
Figure 4:
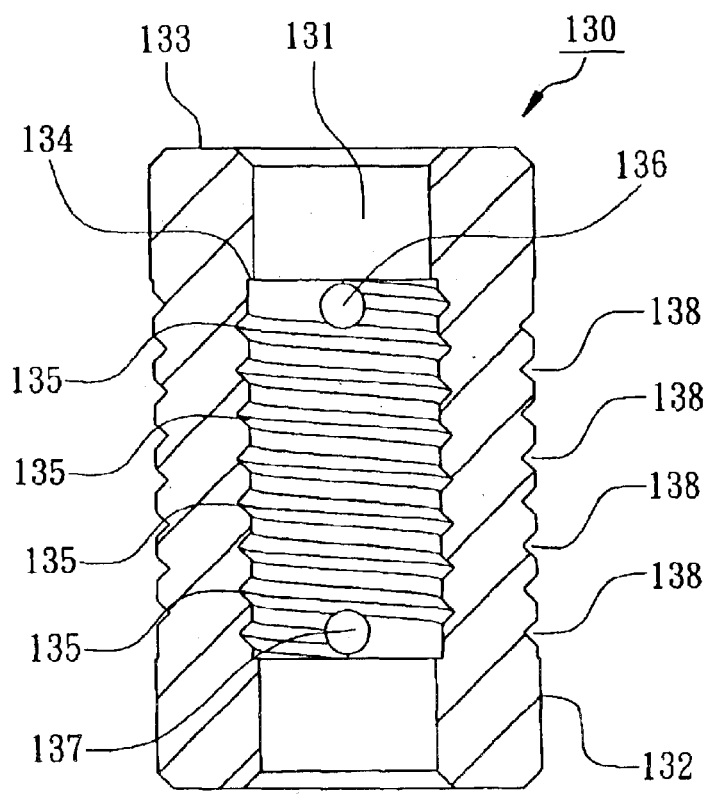
FIG. 4 is a cross sectional view of the oil-circulating structure for fan along FIG. 3 Line 4—4 in accordance with the present invention.
Figure 5:
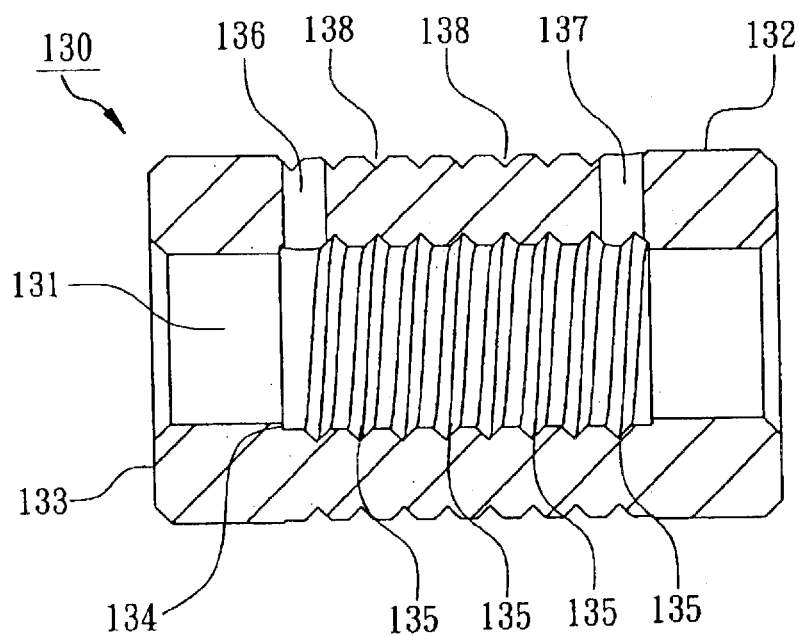
FIG. 5 is a cross sectional view of the oil-circulating structure for fan along FIG. 3 Line 5—5 in accordance with the present invention.

In relation to the oil-circulating structure for fan in accordance with this invention, referring to FIG. 1, a heat-dissipating fan 100 is composed of a fan housing 110, a fan hub 120 (rotor), an oily bearing 130 and a plurality of stators 140. The fan housing 110 has a pivoting base 111 and the oily bearing 130 is equipped at the pivoting base 111 of the fan housing 110. The stators 140 including coils, circuit boards are equipped around the perimeter of the pivoting base 111 for magnetically driving the fan hub 120 to rotate. The oily bearing 130 has a central axis hole 131, an outside wall 132 and an end surface 133 between the central axis hole 131 and the outside wall 132. The central axis hole 131 is used for pivoting a fan shaft 121 of the fan hub 120. When the stators 140 are powered on, the fan hub 120 is driven to rotate by magnetism and the fan shaft 121 pivoted to the central axis hole 131 of the oily bearing 130 also rotates.

Referring to FIG. 2, FIG. 3, FIG. 4 and FIG. 5, the oily bearing 130 is tubular shape, which has the central axis hole 131, the outside wall 132 and the end surface 133 between the central axis hole 131 and the outside wall 132. An inner oil-collecting recess trench 134 is formed in the central axis hole 131 of the oily bearing 130 and has an inner thread shape oil-guiding trench 135 set inside (as showed in FIG. 4 and FIG. 5). The inner thread shape oil-guiding trench 135 could be in left-hand thread or right-hand thread shape to enable a lubricant to be driven by following the rotating fan shaft 121 to upwardly flow over the central axis hole 131. In this embodiment, the inner thread shape oil-guiding trench 135 has a V-shaped cross section preferably, however, it can be other shapes such as square, arc-shape or trapezoid. A first radial through hole 136 and a second radial through hole 137 are respectively set at the upper and lower ends of the inner thread shape oil-guiding trench 135 and penetrate through the oily bearing 130 to connect the central axis hole 131 of the oily bearing 130 to the outside wall 132. Besides, an outer oil-collecting recess trench 138 that may be a recess ring trench or an outer thread shape oil-collecting trench is formed on the outside wall 132 of the oily bearing 130. The outer oil-collecting recess trench 138 is connected with the inner thread shape oil-guiding trench 135 by penetration of the first radial through hole 136 and the second radial through hole 137.

Figure 6:
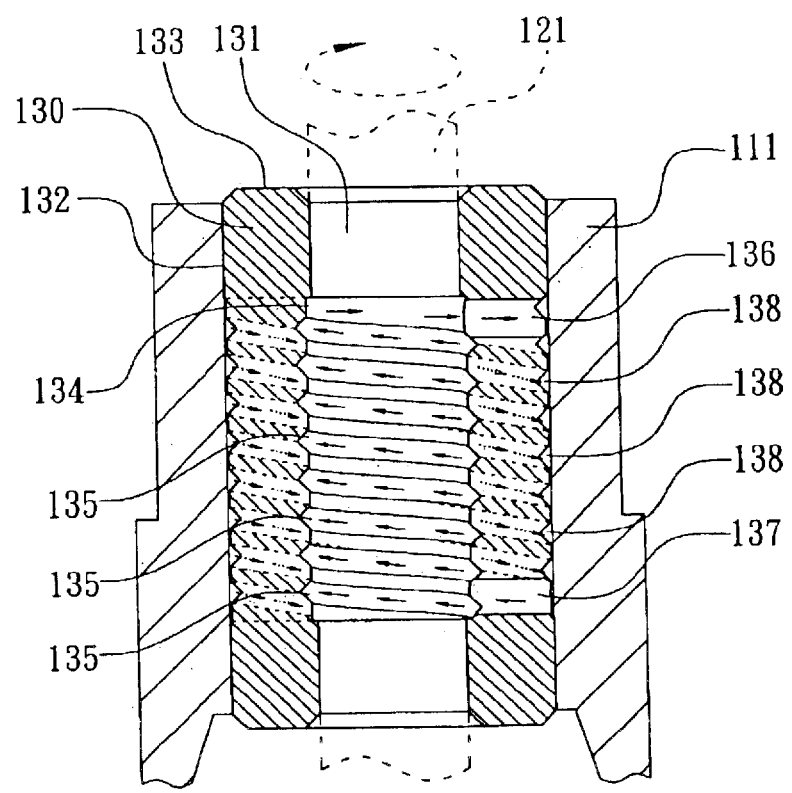
FIG. 6 is a cross sectional of the oil-circulating structure for fan in using status in accordance with the present invention.

Referring to FIG. 6, the oily bearing 130 is equipped inside a pivoting base 111 of the fan housing 110. The bily bearing 130 also matches the pivoting base 111 by spacial embedding to form an external oil-storing space between the outer oil-collecting recess trench 138 and the pivoting base 111 without lubricant leaking. When the fan shaft 121 rotates, the lubricant flows along the inner thread shape oil-guiding trench 135 to distribute over the inner oil-collecting recess trench 134 in the central axis hole 131 of the oily bearing 130 whatever the oily bearing 130 is in straight, reverse or inclined direction. When the lubricant is driven by the rotating fan shaft 121 to flow to an end (upper end) of the inner thread shape oil-guiding trench 135, it may pass through the first radial through hole 136 flow to the outer oil-collecting recess trench 138 without easily overflowing to the end surface 133 of the oily bearing 130, so that the previous defect that the lubricant is forced to sputter on the bearing and flows along the end surface 133 to lose outside the oily bearing 130 is completely avoided. However, the lubricant in the outer oil-collecting recess trench 138 can further flow back to the other end (lower end) of the inner thread shape oil-collecting trench 135 through the second radial through hole 137 or other trench (not shown in figure) so as to achieve the internal-recycle oil-circulating efficiency inside the pivoting base 111 without overflow of the lubricant through the end surface 133 of the oily bearing 130. Especially it is not necessary to install conventional oil-retaining ring above the end surface 133 between the fan shaft 121 and the oily bearing 130.

The above description of embodiments of this invention is intended to be illustrated and not limiting. Other embodiments of this invention will be obvious to those skilled in the art in view of the above disclosure.

What is claimed is:

1. An oil-circulating structure for fan comprising a fan hub with a fan shaft, a fan housing and an oil bearing set in the fan housing, the oil bearing having a central axis hole pivoting with the fan shaft, an inner oil-collecting recess trench being formed in the central axis hole of the oil bearing and having an inner thread shape oil-guiding trench set inside, and an outer oil-collecting recess trench being formed on the outside wall of the bearing, a first radial through hole and a second radial through hole connecting the two ends of the inner thread shape oil-guiding trench with the outer oil-collecting recess trench respectively, when the fan hub rotating, a lubricant in the inner thread shape oil-guiding trench being driven by the rotating fan shaft to flow in-and-out the outer oil-collecting recess trench through the first radial through hole and the second radial through hole so as to perform oil-circulation of the oil bearing.

2. The oil-circulating structure for fan in accordance with claim 1, wherein the inner thread shape oil-guiding trench has a left-hand thread shape.

3. The oil-circulating structure for fan in accordance with claim 1, wherein the inner thread shape oil-guiding trench has a right-hand thread shape.

4. The oil-circulating structure for fan in accordance with claim 1, wherein the outer oil-collecting recess trench is an outer thread shape oil-collecting trench.

* * * * *